United States Patent [19]
Paratte

[11] Patent Number: 5,191,251
[45] Date of Patent: Mar. 2, 1993

[54] ELECTROSTATIC MICROMOTOR

[75] Inventor: Lionel Paratte, Neuchatel, Switzerland

[73] Assignee: Asulab, S.A., Switzerland

[21] Appl. No.: 650,598

[22] Filed: Feb. 5, 1991

[30] Foreign Application Priority Data

Feb. 9, 1990 [CH] Switzerland .............. 00415/90

[51] Int. Cl.$^5$ .............................. H02N 1/00
[52] U.S. Cl. .................... 310/309; 310/40 MM; 310/268; 310/308
[58] Field of Search ............... 310/40 MM, 309, 268, 310/261, 216, 308, 254

[56] References Cited

U.S. PATENT DOCUMENTS

| | | | |
|---|---|---|---|
| 791,310 | 5/1905 | Baker | 310/309 |
| 3,392,293 | 7/1968 | DeBoo | 310/268 |
| 3,984,709 | 10/1976 | Kuwako | 310/40 MM |
| 4,370,582 | 1/1983 | Addicott | 310/268 |
| 4,394,597 | 7/1983 | Mas | 310/268 |
| 4,740,410 | 4/1988 | Muller et al. | |
| 4,754,185 | 6/1988 | Gabriel | 310/309 |
| 4,943,750 | 7/1990 | Howe | 310/309 |
| 5,013,954 | 5/1991 | Shibaike | 310/309 |
| 5,023,830 | 7/1991 | Mas | 310/268 |

FOREIGN PATENT DOCUMENTS 2730041 1/1979 Fed. Rep. of Germany.
63-95867 4/1988 Japan.

OTHER PUBLICATIONS

Report of Lecture entitled "IC-Processed Electrostatic Micromotors", by L. S. Fan, et al., IEEE Integrated Electrical Devices Mtg., San Francisco, Calif., Dec. 1988.
Report of Lecture entitled "IC-Processed Micromotors: Design, Techn. & Testing", by Y. C. Tai, et al., IEEE Micro-Electro-Mechanical Systems, Salt Lake City, Utah, Feb. 1989.
Patent Abstracts of Japan, vol. 12, No. 335 of Sep. 1988.
Article entitled "Harmonic Electrostatic Motors", by W. Trimmer, et al., pp. 17-24, Sensors and Actuators, vol. 12, No. 335, Nov. 15, 1989.
Article entitled "Laterally Driven Polysilicon Resonant Microstructures", by W. C. Tang, et al., pp. 25-32, Sensors & Actuators, vol. 12, No. 335, Nov. 14, 1989.
International Search Report.

*Primary Examiner*—R. Skudy
*Attorney, Agent, or Firm*—Pollock, Vande Sande & Priddy

[57] ABSTRACT

The micromotor comprises a rotor rotatably mounted on a stator having copolanar electrodes for setting up an electric field between the stator and the rotor. To increase the useful torque that can be supplied by the motor, the rotor includes a peripheral ring disposed opposite the electrodes and which is connected to a hub by arms that enable the ring easily to tilt in response to the electric field set up by the electrodes.

8 Claims, 3 Drawing Sheets

ELECTROSTATIC MICROMOTOR

BACKGROUND OF THE INVENTION

This invention relates to an electrostatic micromotor comprising a rotor having a hub and a peripheral region, a stator having coplanar electrodes disposed opposite the peripheral region and intended to produce an electric field between the stator and the rotor, and means for rotatably connecting the rotor's hub to the stator.

All micromotors about to be mentioned hereinafter, including the micromotor according to the invention, are manufactured in plates made of silicon or another material having similar characteristics by means of methods derived from those that are used to manufacture integrated circuits, and which are well known.

Methods for the manufacture of such micromotors are described for example in U.S. Pat. No. 4,740,410, in the report of a lecture entitled "IC-Processed Electrostatic Micromotors" given by L. S. Fan et al. at the IEEE Integrated Electrical Devices Meeting held from 11 to Dec. 14, 1988 in San Francisco, USA, and in the report of a lecture entitled "IC-Processed Micromotors Design, Technology and Testing" given by Y. C. Tai et al at the IEEE Micro-Electro-Mechanical Systems Meeting held in Salt-Lake City, USA, from Feb. 20–22, 1989.

These methods will therefore not again be described here, even if they may differ slightly from one another on the particular construction adopted for the micromotors.

It will be merely remembered that all these methods comprise a step of etching a sacrificial layer with a suitable etching liquor for severing the rotor of the motor from its stator and allowing that rotor to freely turn with respect to that stator.

The above reports disclose micromotors that comprise a flat cross-shaped rotor having four or eight arms joined by a central hub and a stator having six or twelve radial control electrodes arranged in a circle around the rotor and in the same plane as the latter.

The means for mounting the rotor on the stator include a cylindrical opening provided in the central hub and a pivot forming part of the stator and fitted into the opening.

To set the motor's rotor in motion, its arms are each subjected to a tangential force produced by an electrical field set up by a voltage applied to selected control electrodes.

But this electric field also subjects the rotor's arms to radial forces. If the ends of these arms were all strictly equidistant from the control electrodes, these radial forces would compensate each other in pairs and their resultant on the rotor would be nil.

But it is of course impossible to manufacture such a motor that satisfies this condition since, for one thing, there must be some play between the rotor's hub and the stator's stationary pivot for the rotor to be able to rotate about this pivot.

The distances between the ends of any pair of diametrically opposite arms and the control electrodes are thus always different and the radial forces which are exerted on these arms and which are inversely proportional to the square of these distances, do not compensate each other. The rotor is thus also subjected to a resultant radial force that causes the inner surface of its hub's opening to rub against the stationary pivot that extends therethrough.

The resulting friction obviously reduces the motor's useful torque, possibly even to the extent of preventing its rotor to rotate. Further, the effect of such friction cannot be compensated by increasing the voltage applied to the control electrodes because such an increase would have the effect of increasing the radial force exerted on the rotor and hence also to increase the above friction.

A number of motors free of this drawback are described in an article entitled "Harmonic Electrostatic Motors" authored by W. Trimmer and R. Jebens and published in issue 20 (1989) of Nov. 15, 1989 in the journal "Sensors and Actuators" published by Elsevier Sequoia in the Netherlands.

One of these motors, diagrammatically illustrated in FIGS. 4 and 5 of this article, comprises a planar stator provided with control electrodes and having a rotor in the form of a solid circular disc which, in the absence of voltage on the stator's electrodes, is also planar and is moreover parallel to the stator.

The means for mounting this rotor on the stator comprise a pivot forming part of the rotor and necessarily, although not shown, a bearing fixed to the stator, in which the pivot can rotate.

The stator's electrodes are successively and cyclically supplied in such a way that all points of the rotor's periphery come into contact seriatim with all points of the stator located on a circle having a diameter less than the rotor's diameter.

As a result, the rotor rotates about its axis in the same direction as that in which the point of contact between the rotor and the stator travels along the above circle The electrostatic force that attracts a point of the rotor's periphery against the stator is obviously substantially perpendicular to the latter's plane and has therefore practically no radial component, this being an advantage in relation to the other electrostatic motors described above.

But this electrostatic force sets up a tilting torque that tends to cause the rotor's plane to rotate about a straight line perpendicular to the rotor's axis of rotation and to the straight line joining the rotor's center to the point of application of the force.

As this rotor necessarily has some rigidity, this tilting torque also causes the friction between the rotor's pivot and its bearing to increase.

Applicant has now found that, despite the fact that this motor's rotor has been termed "flexible" in the above article, it has, because of its solid disc configuration, a rigidity such that this friction, due to the above tilting torque, is sufficiently great to substantially decrease this motor's torque.

An object of the present invention is to provide a micromotor of a kind similar to the latter, but in which the friction between the moving part and the stationary part of the means for mounting the rotor on the stator is clearly less, whereby the torque supplied by the micromotor according to the invention can be clearly greater, all other things being equal.

To this end the claimed micromotor comprises a rotor having a hub and a peripheral region, a stator including coplanar electrodes opposite said peripheral region for setting up an electric field between said rotor and said stator, and means for rotatably connecting said hub to said stator, wherein said peripheral region is made up of a substantially planar ring substantially parallel to the plane of said electrodes in the absence of said electric field and covering said electrodes at least partially in a plan view of said motor, and wherein said rotor further includes means for mechanically connecting said ring to said hub that are elastically deformable in response to a force applied to said ring in a direction substantially perpendicular to the plane of said electrodes, said hub, said peripheral region and said mechanical connection means defining between them openings extending through said rotor.

The micromotor according to the present invention will now be described hereinafter in detail with reference to the accompanying drawings which illustrate, by way of non-limiting example, several embodiments thereof.

BRIEF DESCRIPTION OF THE DRAWINGS

In the drawings, in which similar elements are designated by the same references

DETAILED DESCRIPTION

Figure 1:
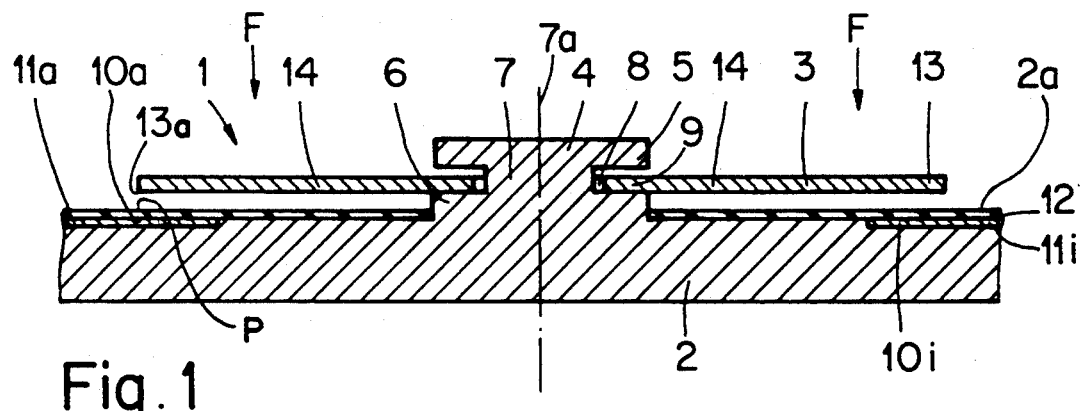
FIG. 1 is a diagrammatic cross-section of one embodiment of the micromotor according to the invention.
Figure 6:
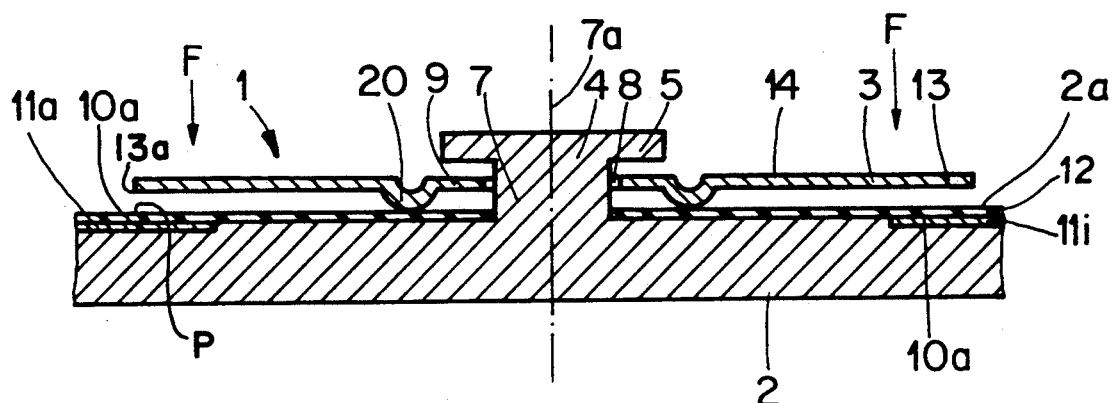
FIG. 6 is a diagrammatic cross-section of a further embodiment of the micromotor according to the invention.

It should be noted that the thicknesses of the various elements of the motors shown in FIGS. 1 and 6 have been greatly exaggerated in relation to the other dimensions of these elements for a better understanding of the drawings.

The micromotor shown in FIG. 1 and referenced 1 comprises a stator 2 and a rotor 3.

In this FIG. 1 embodiment, stator 2 is substantially flat, except at its center where a pivot 4 is located.

Figure 3:
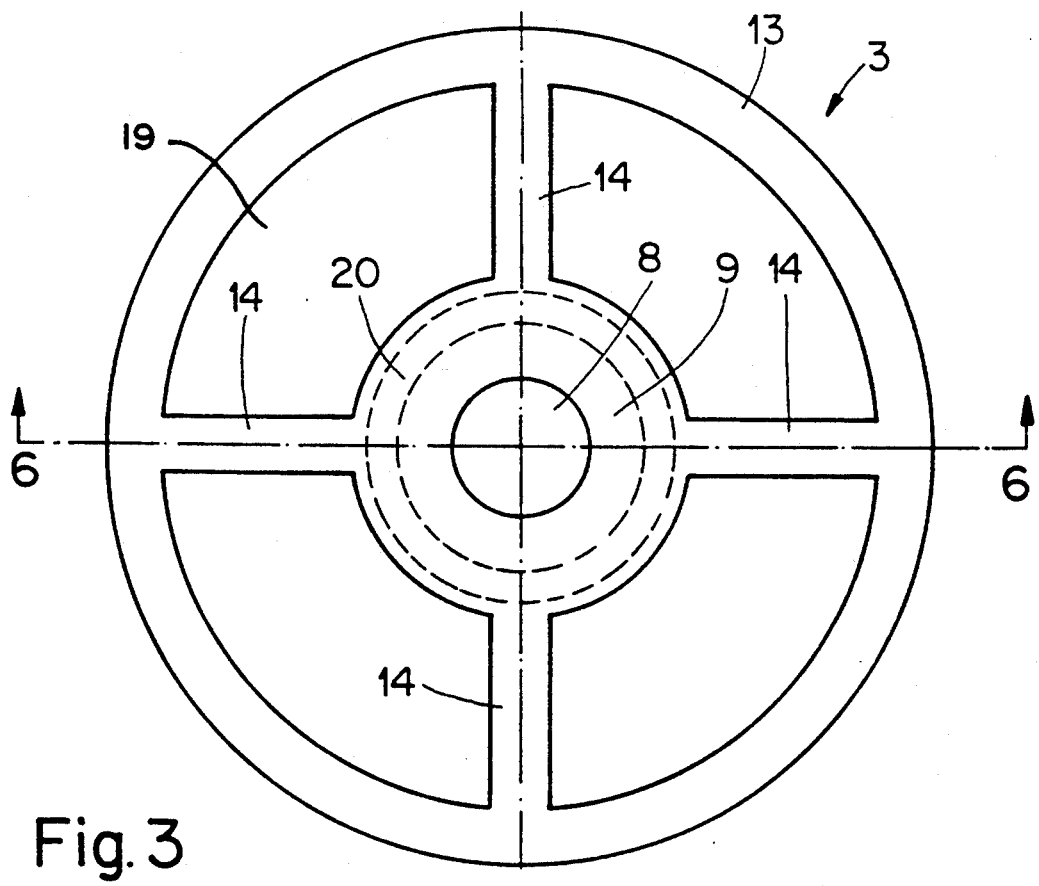
FIGS. 3, 4 and 5 are diagrammatic plan views of three constructional forms of the rotor of the micromotor according to the invention.
Figure 4:
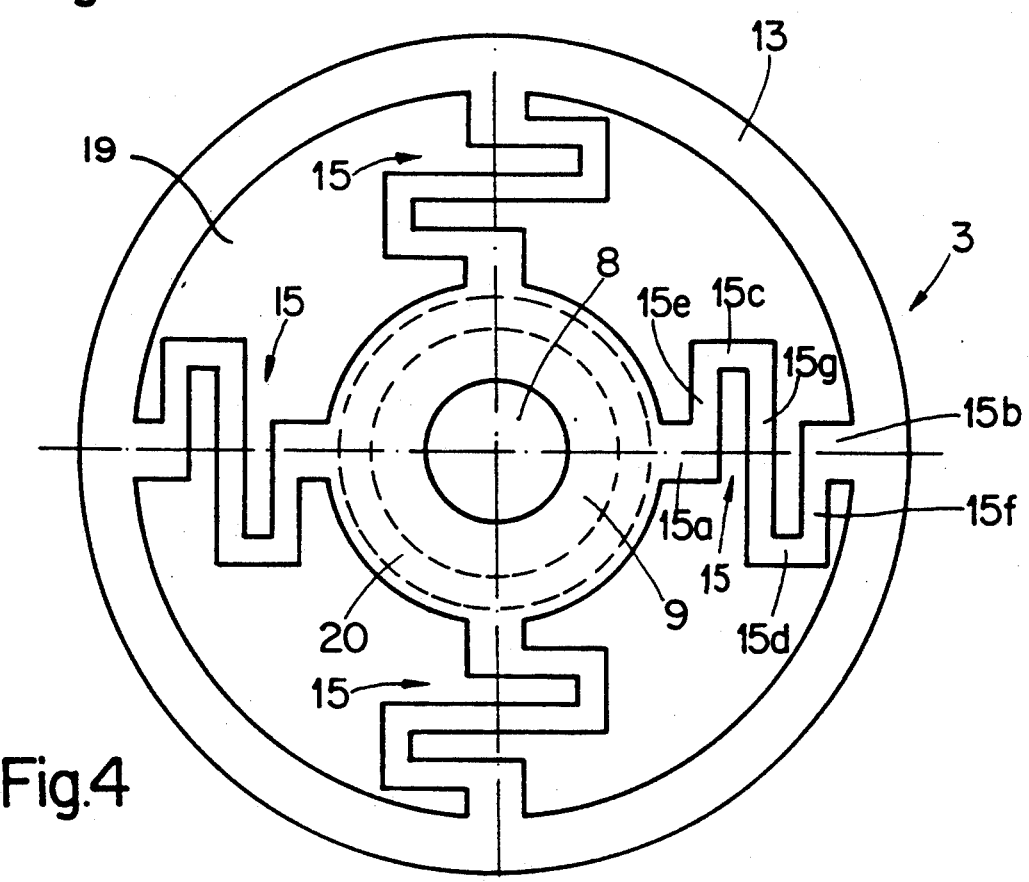
Figure 5:
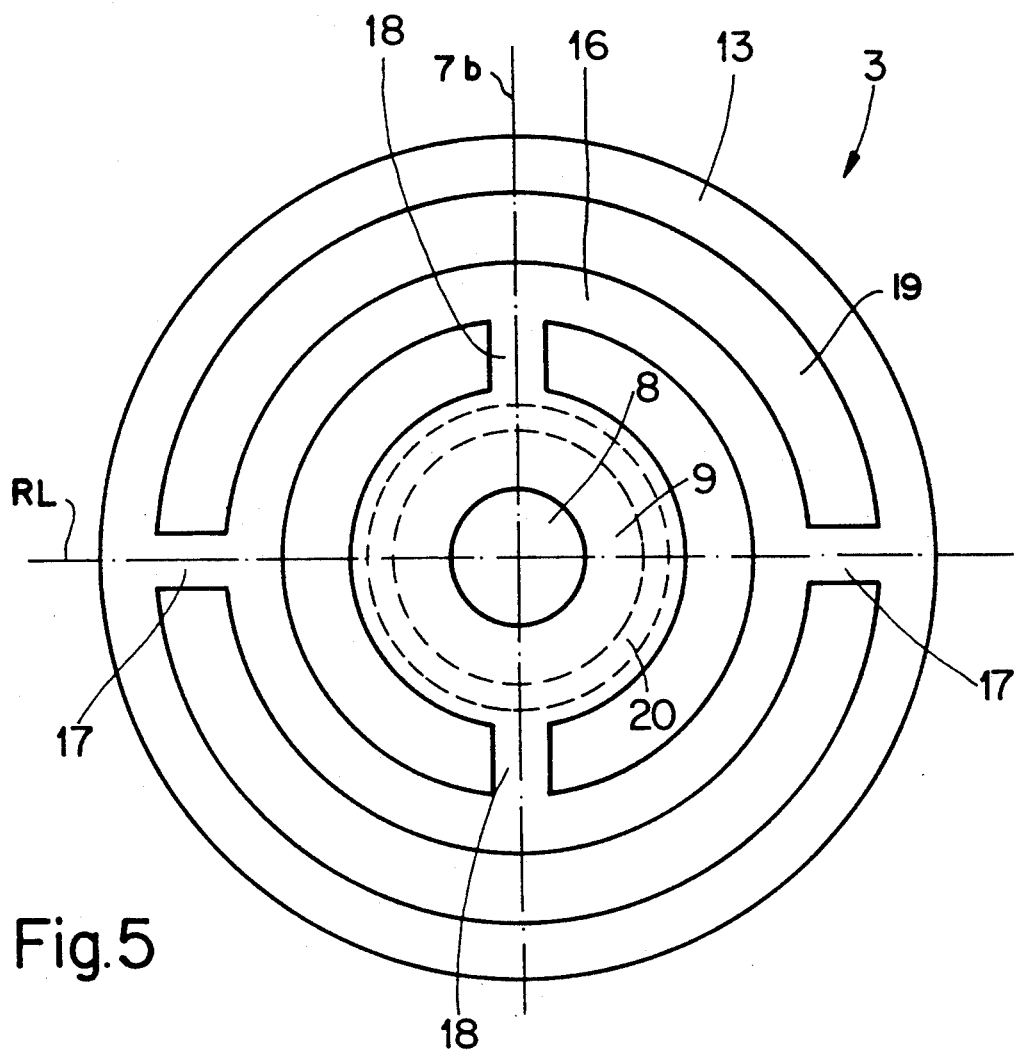

Pivot 4 is integral with stator 2 and comprises two abutments 5 and 6 separated by a cylindrical portion 7 having an axis 7a and that extends through an opening 8, cylindrical also, provided in the hub 9 of rotor 3 (see FIGS. 3 to 5).

The diameter of opening 8 is slightly larger than that of cylindrical portion 7 and less than that of abutments 5 and 6.

Rotor 3 may thus rotate about the cylindrical portion 7 of pivot 4 and is axially held thereon by abutments 5 and 6.

In the FIG. 6 embodiment of motor 1, pivot 4 has no abutment 6 and rotor 3 has a circular rib 20 that bears on the surface 2a of stator 2 and keeps hub 9 a set distance away from surface 2a.

Rib 20, also shown in broken lines in FIGS. 3, 4 and 5, could be replaced by mutually spaced apart bosses bearing on the surface 2a of stator 2 and fulfilling the same function as rib 20. An embodiment with such bosses has not been shown.

Stator 2 includes, in this embodiment, sixteen control electrodes 10a to 10p arranged in a circle concentric with the cylindrical portion 7 or pivot 4. These electrodes, hereinafter referred to collectively as electrodes 10, are all visible in the plan view of stator 2 in FIG. 2.

Figure 2:
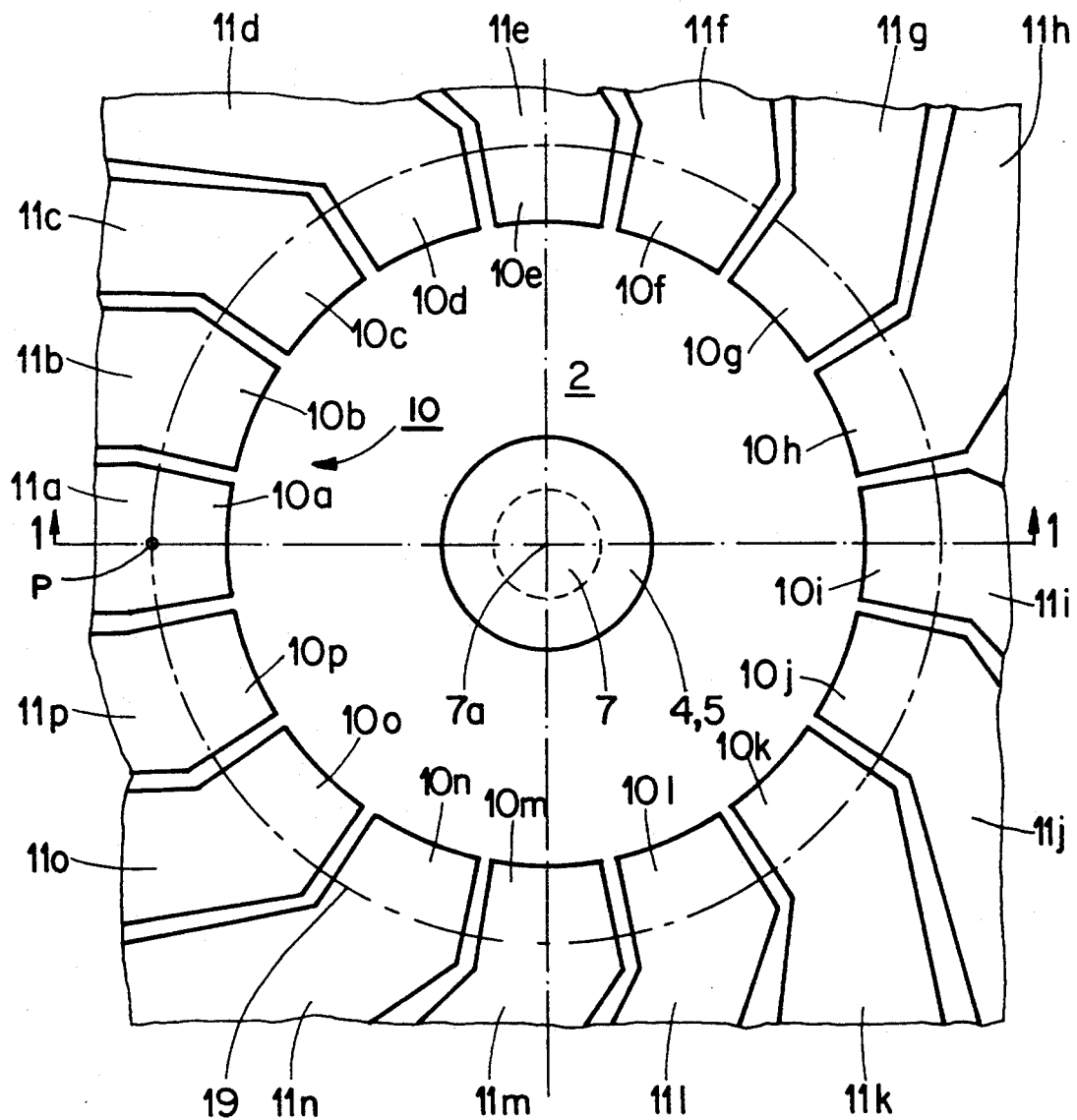
FIG. 2 is a diagrammatic plan view of the stator of the micromotor of FIG. 1.

Normally, electrodes 10 are not wholly visible in a plan view of motor 1 because they are partially hidden by rotor 3 as described below. FIG. 2 thus shows the stator 2 of a motor 1 from which rotor 3 and insulating layer 12 have been removed.

It should also be noted that the cross-section of stator 2 in FIG. 1 is along axis A—A of FIG. 2, and that the cross-section of rotor 3 in FIG. 1 is along axis B—B of FIG. 3 described below.

Electrodes 10 are electrically insulated from one another and are individually connected to a control circuit (examples thereof being described below) by conductive tracks 11a to 11p.

Electrodes 10 are covered with a thin layer of insulation 12 that is flat, at least in the region of electrodes 10, and whose top surface, facing rotor 3, forms the surface 2a of stator 2.

As explained further on, rotor 3 is substantially flat and parallel to the surface 2a of stator 2 when motor 1 is inoperative, i.e. when no voltage is being applied to any one of electrodes 10. Further, rotor 3 is kept a set distance away from surface 2a by the abutment 6 of pivot 4.

FIGS. 3, 4 and 5 illustrate different constructional forms of the rotor 3. Normally, the hub 9 of rotor 3 mentioned earlier is not completely visible in a plan view of motor because the central portion of hub 9 and the opening 8 provided therein are hidden by abutment 5 at the end of pivot 4.

In all of its constructional forms, and particularly in those shown by way of example in FIGS. 3, 4 and 5, rotor 3 includes a peripheral circular ring 13 that is concentric with hub 9 and which is linked to the latter by connection means described below. As will become apparent further on, these connection means define with ring 13 and hub 9 a plurality of openings 19 through the thickness of rotor 3 whereas, in the motor described in the article by W. Trimmer and R. Jebens mentioned earlier, the rotor is a solid disc having no opening.

As will be apparent for anybody skilled in the art, these openings 19 greatly facilitate the already mentioned etching step which is needed during the manufacture of the motor to sever its rotor from its stator.

Peripheral ring 13 is so arranged that it covers electrodes 10 at least partially when viewing motor 1 in the direction of arrows F,F in FIGS. 1 and 6. For a reason which will become clear later on in this description, ring 13 is preferably even so disposed that it is wholly located opposite electrodes 10, still when viewing motor 1 in the direction of arrows F,F.

For reasons which will also become clear further on in the description, ring 13 must, in all constructional forms of rotor 3, be able to stand all forces applied to it during operation of the motor without undergoing any notable deformation. Further, the elements for connecting ring 13 to hub 9 must be so designed as to be able to deform readily when a force is applied at a point of ring 13 in a direction substantially perpendicular to the plane of electrodes 10, whereby, in response to this force, the plane of ring 13 may readily tilt about a straight line substantially perpendicular to axis 7a of the cylindrical portion 7 of pivot 4 and to the radius of ring 13 passing through the point at which this force is applied.

The elements that connect ring 13 to hub 9 must however be sufficiently rigid so as not to become deformed to any substantial extent under their own weight and under that of ring 13, or at least not to an extent such that ring 13 will not contact stator 2 when motor 1 is inoperative, i.e. when no voltage is being applied to electrodes 10, whatever orientation motor 1 may have in relation to the horizontal.

In the FIG. 3 construction, these connecting elements include four rectilinear radial arms 14. Two of them are visible, in cross-section, in FIG. 1 which, as already stated, shows motor 1 fitted with the rotor 3 of FIG. 3.

The above conditions can be satisfied when arms 14 are so dimensioned as to offer little resistance to the flexional stresses they are subjected to when the above mentioned force is being applied to the place where they are connected to ring 13, and little resistance to the torsional stresses they are subjected to in response to this force when the direction of the arms' length coincides with the straight line, mentioned earlier, about which the plane of ring 13 must be able to tilt.

In the FIG. 4 construction for rotor 3, the elements for connecting ring 13 to hub 9 also include four arms, here referenced 15.

Arms 15 are not rectilinear but have each a pair of end portions 15a and 15b which are respectively connected to hub 9 and ring 13 and which are in radial alignment with one another, a pair of intermediate portions 15c and 15d that are parallel to portions 15a and 15b but which are spaced from the latter on opposite sides thereof, and three link portions 15e, 15f and 15g that are at right-angles to portions 15a-15d and which respectively connect portions 15a and 15c, 15b and 15d, and 15c and 15d.

The dimensions of arm portions 15a to 15g can readily be chosen such that arms 15 will have the above characteristics.

All other things being equal, the shape of arms 15 in the FIG. 4 rotor is such as to provide them with a resistance to the flexional and torsional stresses they are subjected to in response to a force applied at a point of ring 13 in a direction perpendicular to the plane of rotor 3 which is less than that which can be imparted to the arms 14 in the FIG. 3 rotor.

But a consequence of the particular shape given to the arms 15 in the FIG. 4 rotor is that their resistance to flexion in directions parallel to the plane of rotor 3 is less than that of arms 14 in the FIG. 3 rotor.

However, as will become apparent below, for motor 1 to work well it is better for the elements connecting ring 13 to hub 9 to have a low resistance to the above mentioned flexional and torsional stresses rather than a high resistance to flexion in directions parallel to this plane. The FIG. 4 design is therefore better, from this point of view, than the FIG. 3 design.

In the FIG. 5 rotor construction, the elements for connecting peripheral ring 13 and hub 9 include an intermediate ring 16 that is concentric with peripheral ring 13 and with hub 9 and which is connected to ring 13 and to hub 9 by a first pair of rectilinear arms 17 and by a second pair of arms 18, respectively. The pair of arms 17 and the pair of arms 18 are respectively disposed on first and second diameters of rotor 3, that are perpendicular to one another.

In this rotor construction also, the various components of the connecting elements can readily be so dimensioned as to provide these elements with the above characteristics.

There are many more rotor constructions in which the elements for connecting ring 13 to hub 9 also have the required characteristics. These other constructions are not being illustrated here as their design can readily be derived from the FIGS. 3, 4 and 5 constructions.

Thus, for instance, these connection elements may include more or less than four arms similar to arms 14 and 15 in FIGS. 3 and 4, or even include only one.

For instance also, the connection means may include four arms similar to arms 17 and 18 in FIG. 5 and, instead of ring 16 in FIG. 5, a pair of ring portions symmetrically arranged about the center of rotor 3, with each portion connecting one of the arms similar to arms 17 to one of the arms similar to arms 18. These connection means could even comprise only two arms with one being similar to one of arms 17 and the other being similar to one of arms 18, and the two being connected by a single intermediate ring portion.

As regards the operation of motor 1, all of these rotor constructions are practically equivalent and it practically makes no difference for the rotor's hub 9 to be spaced from the stator's surface 2a by an abutment 6 as in FIG. 1 or by a rib 20 as in FIG. 6.

In order not to complicate unduly the following description of the motor's operation, no special reference will be made to one or other of these constructions, but simply to rotor 3, and this description will be restricted to the FIG. 1 case.

Consideration will first be given to the case where the rotor 3 of motor 1 is made of electrically conductive material, e.g. polycrystalline silicon, where the pivot 4 of stator 2 is also made of electrically conductive material, e.g. again polycrystalline silicon, and where pivot 4 is electrically connected, e.g. by a lead embedded in the stator's material, to a first terminal of the electric supply source of the device made up of motor 1 and its control circuit.

In this case, rotor 3, whose hub 9 is always in contact with pivot 4, is thus also connected to this first terminal of the supply source. Possibly, the outer surface of pivot 4 and/or of rotor 3 may be coated with a thin layer of a good electricity conductive material, such as a metal, to improve the electrical contact between pivot 4 and rotor 3.

The motor's control circuit is arranged in this case successively and selectively to connect each one of electrodes 10 to the second terminal of the device's source of supply when motor 1 is required to operate.

It will first be assumed that this control circuit connects electrode 10a to the supply source's second terminal.

In response to the control voltage thus applied across rotor 3 and electrode 10a, the latter and the facing portion of ring 13 are subjected to an electrostatic force which is produced by the electric field set up by this voltage and which tends to attract this portion of ring 13 against electrode 10a.

If the control voltage that gives rise to this force is sufficient, the latter subjects ring 13 to a tilting torque that causes its plane to rotate about a straight line 7b (FIG. 5) that is substantially perpendicular, to the axis 7a of the cylindrical portion 7 of pivot 4 and to a radical line RL of ring 13 that passes through the point at which this force is applied. In response to this tilting torque, a point along the ring's edge 13a (FIG. 1) comes into contact with the stator's surface 2a at a point of contact P (FIG. 2) opposite electrode 10a, by virtue of the above-mentioned characteristics of the elements for connecting ring 13 to the rotor's hub 9.

Since the stator's surface 2a is formed by the insulating layer 12, there is no electrical contact between ring 13 and electrode 10a.

The extent of the area of mechanical contact between the ring 13 and the stator's surface 2a depends of course on the hardness of the contacting materials, on the force generated by the electric field and on the flexibility of the elements linking ring 13 to hub 9. This area is however sufficiently small to be assimilated to a point which will be termed point of contact in the remainder of this description.

If now the control circuit cuts off the voltage it was applying across rotor 3 and electrode 10a, the portion of ring 13 that was being pressed against the stator's surface 2a will tend to return to its initial position due to the elasticity of the elements connecting ring 13 to hub 9.

If moreover, at the same time as it cuts off the voltage across rotor 3 and electrode 10a, the control circuit applies a voltage of equal amplitude across rotor 3 and electrode 10b, the latter and the portion of ring 13 facing it will in turn be subjected to an electrostatic force that causes another point of edge 13a of ring 13 to contact another point of stator surface 2a at a position facing electrode 10b.

Between the former and the latter situations, the edge 13a of ring 13 will roll on stator surface 2a, provided of course that the resistive torque applied to rotor 3 is not too large and that the control voltage is applied across electrode 10b and rotor 3 at the exact instant when it is cut off across electrode 10a and rotor 3, possibly even slightly before this instant.

This procedure can of course be continued, with the control circuit of motor 1 successively and individually applying a voltage across rotor 3 and each of electrodes 10c, 10d, etc.

This successive application of the control voltage across rotor 3 and electrodes 10 causes the edge 13a of ring 13 to roll on the stator's surface 2a and to successively contact the points of circle 19 shown in chain-dotted lines in FIG. 2. Circle 19 will hereinafter be termed "circular rolling path".

In the above construction, the points of contact describe the circular rolling path 19 in a direction set by the alphabetical order of the letter indicia used in conjunction with the references of electrodes 10. The direction of succession of the points of contact along circular rolling path 19 can of course be reversed by changing the order in which electrodes 10 are subjected to the control voltage.

The radius of circular rolling path 19 is less than the radius of rotor 3 and is given, by way of first approximation, by the relationship $$r = \sqrt{R^2 - d^2}$$

in which r is the radius of circle 19, R is the radius of rotor 3 and d is the distance between ring 13 and the surface 2a of stator 2 in the absence of voltage on electrodes 10.

This means that the circumference of circular rolling path 19 is shorter than that of rotor 3 and that, each time the points of contact have successively occupied all positions on rolling path 19, they have not occupied all positions on the edge 13a of ring 13.

For example, if a first point along edge 13a comes into contact with stator surface 2a at the point P (FIG. 2) when the control voltage is applied to electrode 10a, a second point of edge 13a will come into contact with surface 2a at point P when this same electrode is again subjected to this control voltage after all other electrodes have successively been subjected thereto.

The distance between the first and second points along edge 13a is equal to the difference between the length of the circumference of rotor 3 and the length of the circumference of circular rolling path 19.

With reference to the direction of succession of the point of contact along rolling path 19, the first point is ahead of the second point. Rotor 3 thus rotates about pivot 4 in the same direction as the successive points of contact or, in other words, in the same direction as that in which electrodes 10 are successively subjected to the control voltage. Further, the axis of rotation of rotor 3 coincides substantially with the axis 7a of the cylindrical portion 7 of pivot 4.

Thus, whatever the angle travelled by the points of contact between rotor 3 and stator 2, the ratio K between this angle and the corresponding angle of rotation of rotor 3 about pivot 4 is given by the relationship:

$$K = \frac{r}{R - r}$$

in which r and R are respectively the radii of the circular rolling path 19 and of the rotor 3, both defined above.

Since the distance d which separates ring 13 and stator surface 2a in the absence of voltage on electrodes 10 and which defines radius r in relation to radius R as already shown above is generally small with respect to radius R, the ratio K may be very large.

Thus, for example, the applicant has designed a motor, such as that shown in FIGS. 1 and 2, in which distance d is about 2 micrometers and radius R is about 250 micrometers. In this motor, the ratio K is thus about 31000.

This means that the motor's control circuit must successively feed all electrodes 10 about 31000 times for rotor 3 to complete one revolution about pivot 4.

As already mentioned, the electrostatic force that results from applying a voltage across rotor 3 and one of electrodes 10 has no radial component, i.e. directed along a radius of rotor 3, but sets up a tilting torque that causes the plane of ring 13 to rotate about a straight line that is substantially perpendicular to the axis of rotation of rotor 3 and to the radius of ring 13 and which passes through the point at which this force is applied.

This tilting torque is equal, at least by way of first approximation, to the product of the radius of ring 13 times the electrostatic force that is needed for the ring's edge 13 just to touch the stator's surface 2a. Since this force is obviously that much less when the rotor is more flexible, it will become apparent that, in the case of a motor according to the invention, the tilting torque and hence the friction between hub 9 and pivot 4 will be much less, and that the useful torque that can be provided by the motor is substantially greater than in the case of the motor described in the article cited earlier.

The useful torque that can be supplied by the motor depends directly on the magnitude of the control voltage applied across electrodes 10, one after the other, and rotor 3, but the above-mentioned tilting torque is practically independent of this control voltage, provided of course the latter is greater than that needed for the edge 13a of ring 13 just to contact the stator's surface 2a.

The maximum value of this useful torque thus corresponds to the maximum voltage that can be applied across electrodes 10 and rotor 3, i.e., in theory, to the breakdown voltage of the insulating layer 12.

In practice, this control voltage is of course less than the breakdown voltage for obvious safety reasons.

During rotation of rotor 3, the means connecting its ring 13 to its hub 9 are obviously subjected to a flexional stress that is directed substantially in the plane of rotor 3. But it is easy to determine the dimensions required for the various components of these connection means so as not to risk breakage in response to this flexional stress when the motor is working at maximum torque.

This flexional stress obviously causes deformation of the connection means, thereby causing an angular shift between hub 9 and ring 13. But, in most uses of a micromotor according to the invention, this shift does not play a big part and that is why, as already stated before, the means for connecting ring 13 to hub 9 do not necessarily need to have a great resistance to flexion in the plane of rotor 3.

The motor's control circuit whose operation has just been described has not been illustrated since the designing of such a circuit will cause no difficulty to a man of the art. Should motor 1 be produced in a plate of semiconductive material, the control circuit can readily be produced in the same plate and at the same time as the motor.

Consideration will now be given to the case where the rotor 3 of motor 1 is also made of conductive material, e.g. polycrystalline silicon, but where the pivot 4 of stator 2 is made of insulating material, or is made of a conductive material but is not connected to one of the terminals of the device's supply source.

In this case, the motor's control circuit must be so arranged as to apply selectively and cyclically a voltage across two adjacent electrodes 10 when motor 1 is required to operate.

Suppose to begin with that these two adjacent electrodes are electrodes 10a and 10b.

The electric field by the control voltage that is applied across electrodes 10a and 10b extends to a region located on opposite sides of the plane of these electrodes, and thus in particular into the space separating the latter from the rotor's ring 13.

This electric field creates in turn an electrostatic force that tends to attract the portion of ring 13 opposite electrodes 10a and 10b against the latter.

If the voltage that is applied to electrodes 10a and 10b is sufficient, ring 13 tilts as described earlier and, also as described earlier, a point along its edge 13a comes into contact with stator surface 2a. But in this case, the point of contact is located between electrodes 10a and 10b.

But should now the control circuit cut off the voltage across electrodes 10a and 10b and simultaneously apply a voltage of equal magnitude across electrodes 10b and 10c, the point of contact between the edge 13a and the stator's surface 2a will move until it comes to be located between electrodes 10b and 10c.

As in the first case described earlier, the edge 13a rolls without slipping on stator surface 2a during this movement, provided of course the resistive torque applied to the rotor is not too large, and that the control voltage is applied across electrodes 10b and 10c at the exact instant when it is cut off across electrodes 10a and 10b, possibly even slightly ahead of this instant.

This procedure can of course be carried on, the motor's control circuit then applying the control voltage successively to each pair of adjacent electrodes 10c and 10d, 10d and 10e, etc., and the rotor's edge 13a rolling on the stator's surface 2a as described above.

Again as above, the rolling of the edge 13a of ring 13 on the stator's surface 2a causes rotor 3 to rotate about its axis in the direction of rotation of the point of contact of edge 13a on surface 2a.

Also, the order in which the pairs of adjacent electrodes are subjected to the control voltage can of course be reversed to change the direction of rotation of rotor 3.

The control circuit that enables motor 1 to operate as just described need not be illustrated either as its design would not cause any difficulty either to a man of the art.

Clearly, all of the above considerations about the deformations to which are subjected the means connecting ring 13 to hub 9 and about the advantages of a motor according to the invention in relation to known motors apply equally to the case just described.

When however the control voltage is applied to two adjacent electrodes 10, as just described, the voltage of rotor 3 is raised, with respect to each of these electrodes 10, to a value substantially equal to half the control voltage. As a result, the latter can be about twice as high as in the case where motor 1 is controlled in the first manner described earlier, since only half the control voltage need be less than the breakdown voltage of insulating layer 12. As a result also, all other things being equal, the useful torque that motor 1 can supply is much higher when it is controlled as just described

I claim:

1. An electrostatic micromotor comprising a rotor having a hub and a peripheral region, a stator including electrodes disposed in a plane and facing said peripheral region and adapted to produce an electric field between said stator and said rotor, and means for mounting said hub on said stator for rotation of said rotor relative to said stator, wherein said peripheral region comprises a substantially planar ring substantially parallel to said plane of said electrodes in the absence of said electric field and disposed at least partially in a facing relationship with said electrodes, and wherein said rotor further includes connection means for mechanically connecting said ring to said hub, said connection means being elastically deformable such that said ring is tilted relative to said stator in response to an electrostatic force applied to said ring by said electric field in a direction substantially perpendicular to said plane of said electrodes, and said connection means cooperating with said hub and said peripheral region to define a plurality of openings extending through said rotor to achieve said elastic deformation.

2. A micromotor according to claim 1, wherein said connection means includes a rectilinear arm extending radially of said rotor.

3. A micromotor according to claim 1, wherein said connection means includes an arm having two first portions extending radially of said rotor and connected to one another by a plurality of second portions alternately perpendicular and parallel to said two first portions.

4. A micromotor according to claim 1, wherein said connection means includes a first arm having a first end connected to said peripheral region and extending along a first radius of said rotor, a second arm having a first end connected to said hub and extending along a second radius of said rotor, and a linking element connected to a second end of said first arm and to a second end of said second arm.

5. A micromotor according to claim 1, wherein the tilting of said ring causes the plane of said ring to rotate about a straight line substantially perpendicular to a rotational axis of said rotor and to a radial line of said ring passing through a point at which said electrostatic force is applied.

6. A micromotor according to claim 1, wherein said electrostatic force causes said ring to be tilted into contact with said stator.

7. A micromotor according to claim 6, wherein said electrostatic force causes said ring to be tilted into contact with said stator at a position opposite an electrode.

8. A micromotor according to claim 6, wherein said electrostatic force causes said ring to be tilted into contact with said stator at a position between adjacent electrodes.

* * * * *